Nov. 22, 1966  M. M. DELAO ETAL  3,286,641

JET BOAT PUMP

Filed Jan. 13, 1964

INVENTORS
Martin M. Delao and
Theodore M. Englehart
BY Lockwood, Woodard, Smith & Weikart
Attorneys

United States Patent Office 3,286,641
Patented Nov. 22, 1966

3,286,641
JET BOAT PUMP
Martin M. Delao and Theodore M. Englehart, Indianapolis, Ind., assignors to The Buehler Corporation, Indianapolis, Ind., a corporation of Indiana
Filed Jan. 13, 1964, Ser. No. 337,206
3 Claims. (Cl. 103—93)

The present invention relates to jet boat pumps.

Axial flow jet boat pumps are designed to change the velocity of water passing through the pump and to thereby provide a force acting on the boat tending to cause movement thereof. The velocity of the water is changed by increasing the total pressure head of the water as it moves through the pump and then by causing the water to be expelled from the conduit through an opening of restricted size. It is desirable that the water so pumped be operated upon with the greatest possible efficiency and in such a way that as little energy as possible be lost from the primary function of delivering of force to move the craft. Consequently, a primary object of the present invention is to provide a jet boat pump which operates with greater efficiency than presently available pumps.

Related objects and advantages will become apparent as the description proceeds.

One embodiment of the present invention might include propulsion apparatus for watercraft comprising a water conveying conduit having an inlet end and a restricted outlet end, a shaft extending longitudinally and centrally of said conduit, a pair of annular bearings surrounding said shaft and spaced longitudinally thereof, radially extending stator vanes fixed to the annular bearings and the interior surface of said conduit and mounting said bearings centrally of said conduit for rotatable support of said shaft, a first hub fixed to said shaft upstream of said stator vanes and positioned adjacent one of said annular bearings, a plurality of rotor blades fixed to said first hub, a second hub fixed to said shaft between said bearings, a plurality of rotor blades fixed to said second hub, means for rotating said shaft to cause said rotor blades to pump water through said conduit, said first hub having a diameter which tapers linearily with distance from a smaller diameter toward the inlet end to a larger diameter adjacent said one bearing, said one bearing having a constant outside diameter equal to the diameter of said first hub at its larger end, said second hub having one end adjacent said one bearing and its other end adjacent said other bearing, said second hub having a diameter which increases linearly with distance from a diameter at said one end which is equal to the diameter of said one bearing to a larger diameter at said other end, said other bearing having a constant outside diameter equal to the diameter of said second hub's other end, the interior surface of said conduit having a configuration which tapers linearly from a larger upstream to a smaller downstream diameter around said first hub and rotor blades, is then of constant diameter around said one bearing, then tapers linearly to a smaller downstream diameter around said second hub and rotor blades, and is then of constant diameter around said other bearing and blades, whereby an annular water passage is provided which decreases in area about said rotor hubs and is constant in size about said bearings.

The full nature of the invention will be understood from the accompanying drawings and the following description and claims.

Figure 1:
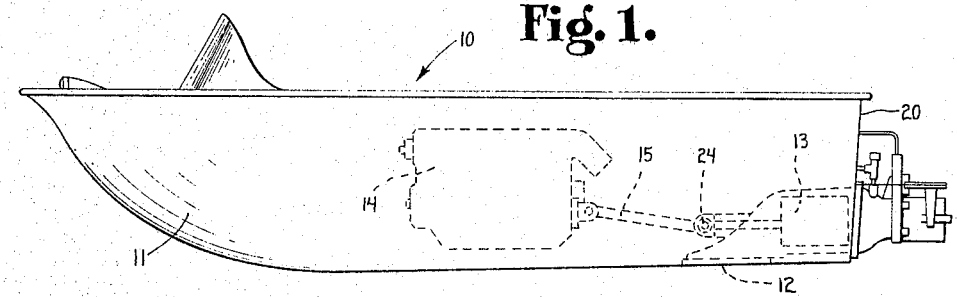
FIG. 1 is a side elevation of a jet boat incorporating the novel jet boat pump of the present invention.
Figure 2:
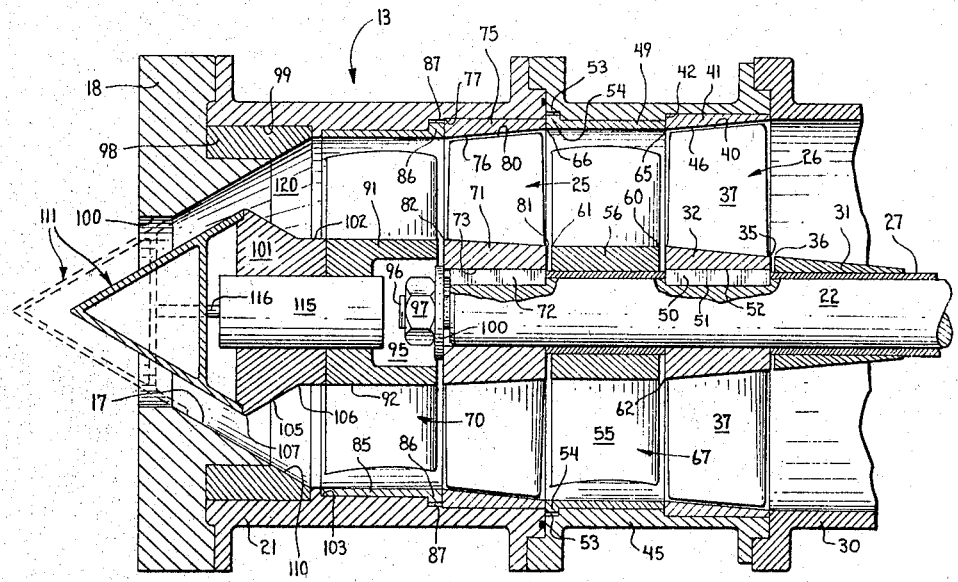
FIG. 2 is a longitudinal section of a jet boat pump embodying the invention and forming part of the structure of FIG. 1.

Referring now more particularly to the drawings, there is illustrated a jet boat 10 including a hull 11, the hull being provided with an intake opening 12 and communicating between the bottom of the boat and a pump 13. The pump is driven by a conventional marine engine 14 through a shaft 15 and functions to pump water from the intake 12 to and out of the rear of the boat. The water is formed into a jet stream by the converging surface 17 of an annular member 18 at the rearward end 20 of the boat, the annular discharge housing 18 being fixed to the pump 13 and more particularly to the booster housing 21 thereof.

The pump 13 includes a shaft 22 which is connected by the universal joint 24 to the shaft 15 and which drives or rotates rotors 25 and 26. A spacer tube 27 is fixed to the forward portion of the housing 30 and acts as a bearing for the shaft 22. Fixed to the spacer tube 27 or integral therewith is an annular member or element 31 having an external frusto-conical shape which tapers from a smaller upstream diameter to a larger downstream diameter at rearward end 36.

Figure 3:
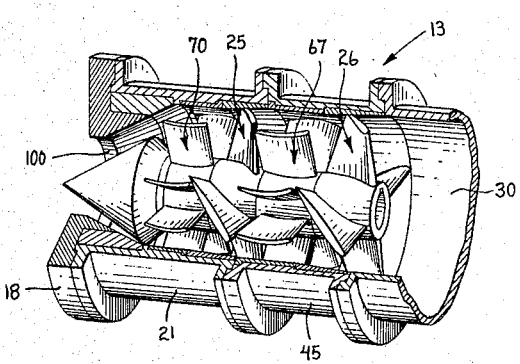
FIG. 3 is a fragmentary perspective view of the sturcture of FIG. 2.

The rotor 26 includes a hub 32 which also has an external frusto-conical shape with the forward end 35 thereof having the same diameter as the rearward end 36 of the element 31. The rotor 26 further includes a plurality of blades 37 each of which are fixed to the hub 32 and each of which have the configuration illustrated generally in FIG. 3. The distal end 40 of each blade is formed to complement the shape of the internal surface of a rub ring 41 received within an annular recess 42 in a reactor housing 45.

The inlet housing 30 is fixed to the reactor housing 45 and thereby locks the rub ring 41 within the recess 42. It will be noted that the internal surface 46 of the rub ring is frusto-conical in shape and tapers linearly in cross section downstream of the pump. The hub 32 is keyed to the shaft 22 by means of key 50 received in keyway 51 in the shaft and in keyway 52 in the hub. The reactor housing 45 also has received therein a stator shroud 49 which is provided with keys 54 received within keyways 53 in the reactor housing. Fixed to the stator shroud 49 is a plurality of stator blades 55 which mount at their internal ends a bearing 56. The bearing 56 rotatably receives the shaft 22 and provides support therefor.

The bearing 56 has a constant external diameter from its forward end 60 to its rearward end 61. The diameter of the forward end 60 is equal to the diameter at the rearward end 62 of the hub 32. The internal diameter of the stator shroud is constant from its forward end 65 to its rearward end 66. Thus, it can be seen that the rotor 26 provides, by means of the hub and the rub ring, linearly tapering surfaces which reduce the cross sectional area of the flow passage of the water as it goes through the pump. On the other hand, as the water moves past the stator 67, the cross sectional area of the water remains constant as it moves from the forward end 60 to the rearward end 61.

The rotor 25 and the stator 70 mounted within the booster housing are similarly configured to reduce the cross sectional area of the annular flow passage through the rotor and to maintain the flow passage of constant area through the stator. Thus, the rotor 25 is provided with a hub 71 which is keyed to the shaft 22 by the key 72 received within keyways 73 in the shaft and rotor. A rub ring 75 having a frusto-conical internal shape 76 is received within a recess 77 in the booster housing 21. The distal ends 80 of the rotor 25 are formed in a complementary shape to the internal surface 76 of the rub ring. The hub 71 has a diameter at its forward end 81 equal to the diameter of the bearing 56 and has a diameter at its rearward end 82 larger than the diameter of the forward end 81. Between the forward end and rearward end 81 and 82, the hub 71 tapers linearly in a frusto-conical shape.

A stator shroud 85 is fixed by keys 86 against rotation relative to the booster housing 21, said keys 86 being received within keyways 87 in the booster housing. The stator 70 includes radial vanes 90 which fixedly mount at their inward ends a member 91 having an external cylindrical surface 92. The member 91 is formed with a hollow portion 95 which receives the threaded end 96 of the shaft 22. A nut 97 is received upon the threaded end 96 and bears against a washer 100 which, in turn, bears against the hub 71.

The stator shroud 85 is received within a recess 103 and is locked firmly within the recess by the rub ring 75. It can be seen that the flow passage through the rotor 25 and the stator 70 within the booster housing decreases in cross sectional area as a result of the linear taper of both the hub 71 and the rub ring 75. The flow passage, however, maintains a constant area through the stator 70.

A further annular member 98 is received within a recess 99 in the booster housing 21 and is locked in position by the annular discharge housing 18 which is fixed, as mentioned, to the booster housing 21. The member 98 along with the member 18 guides the water into a jet stream as mentioned above, said water leaving the pump through the orifice 100 provided by the discharge housing 18. Mounted upon the member 91 is a further member 101 which has a cylindrical portion 102 and a frusto-conical portion 105. The cylindrical portion 102 is coextensive with and of equal diameter to the outside diameter of the member 91 while the frusto-conical portion tapers from its forward end 106 to a larger rearward end 107. It can be seen that the frusto-conical portion 105 is located radially inwardly of the frusto-conical surface 110 of the member 98 whereby the water is constricted as it moves through the annular passage between these two members.

A conical fairing 111 is mounted upon the member 101 by means of a fluid motor 115 and its piston 116. The conical fairing can be retracted to the illustrated solid line position for normal operation of the pump to form a jet stream. The conical fairing can be projected to the dotted line position to close off the orifice 100 and to cause the pump to produce water pressure for various applications such as, for example, fire fighting. In such an application, the pump would be provided with an outlet opening leading from the water passage area 120 possibly through the wall of the booster housing 21. Various means can be provided for projecting and retracting the conical fairing 111, for example, a rack might be fixed relative to the conical fairing, said rack being operated upon by means of a pinion having a shaft which extends through the wall of the booster housing.

Figure 4:
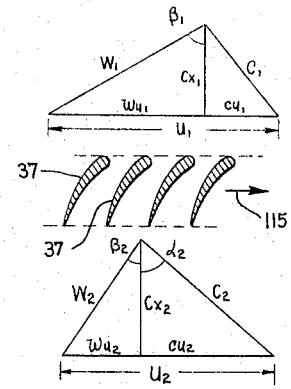
FIG. 4 is a vector diagram and cross sectional view of cascade vanes showing the effect of pump operation.

Presented below is an analysis which shows the desirability of reducing the flow annulus in area from the inlet to the outlet of the pump. Referring to FIG. 4, the arrow 115 represents the rotation of the rotor 26, said rotor having blades 37 which are shown schematically in section in FIG. 4. The various vectors in FIG. 4 are marked with their symbols as used in the analysis below.

The generation of total head in an axial-flow pump results from the dynamic action of the rotating "airfoil" cascade (rotor 26) which converts the kinetic energy of rotation into an increase in total pressure across the cascade. Dynamically, from the vectorial geometry shown in FIG. 4, the cascade rotates at a circumferential velocity (U), working on a fluid capacity dictated by the axial velocity ($Cx_1$). The primary action of the cascade reduces the magnitude of relative velocity ($W_1$) to ($W_2$), and this action results in an increase in static pressure across the cascade. The total pressure at the exit of the rotating cascade is the sum of that static pressure and the kinetic energy of the absolute velocity ($C_2$). The magnitude of total pressure rise (that is, the magnitude of total head generated) then depends on (1) the value of exit circumferential velocity ($U_2$), (2) the value of the exit axial velocity ($Cx_2$), and (3) the value of the relative angle ($\beta_2$).

The momentum theory for the generation of total head ($Ho$) in an axial-flow pump is due to Leonard Euler, and is shown as:

$$gHo = \eta o (U_2 cu_2 - U_1 cu_1)$$

For the general case of a pump without inlet guide vanes, the inlet tangential velocity ($cu_1$) is zero, and the Euler equation is $$gHo = \eta o (U_2 cu_2) \quad (1)$$

and the total head achieved is the product of efficiency ($\eta o$) and the tangential velocities ($U_2$) and ($cu_2$). With some manipulation of the vector diagram relationships shown in FIG. 4, Equation 1 can be shown to be:

$$gHo = \eta o C x_2 u_2 \left( \frac{u_2}{Cx_2} - \tan \beta_2 \right) \quad (2)$$

The ratio of the total head generated to the kinetic energy of rotation ($U_1^2/2g$) is commonly defined in hydrodynamics as the work coefficient ($\epsilon o$), and the ratio of inlet axial velocity ($Cx_1$) to the circumferential velocity ($U_1$), as the flow coefficient ($\phi$). The value of these coefficients in hydrodynamic design is that the integrated average relationship of one to the other determines the performance of the hydrodynamic machine. Introducing the work coefficient and flow coefficient definitions into Eq. 2 it can be shown that the expression for efficiency becomes:

$$\eta o = \frac{\epsilon o}{2 \frac{u_2}{u_1} \left( \frac{u_2}{u_2} - \frac{Cx_2}{Cx_1} \phi \tan \beta_2 \right)}$$

For the axial-flow pump where $U_1 = U_2$, the efficiency to accomplish a given work coefficient ($\epsilon o$) depends only on the value of the flow coefficient ($\phi$), the relative angle ($\beta_2$) and the ratio of axial velocities ($Cx_2/Cx_1$), thus:

$$\eta o = \frac{\epsilon o}{2 \left( 1 - \frac{Cx_2}{Cx_1} \phi \tan \beta_2 \right)} \quad (3)$$

It can be seen, therefore, that according to Eq. 3 the efficiency of an axial-flow unit of fixed characteristics of work coefficient ($\epsilon o$), flow coefficient ($\phi$) and angle ($\beta_2$), increases as the ratio of axial velocities increases. For example:

| $\epsilon o$ | .4 | .4 | .4 |
|---|---|---|---|
| $\phi$ | .5 | .5 | .5 |
| $\beta_2$, degrees | 45 | 45 | 45 |
| $\tan \beta_2$ | 1.0 | 1.0 | 1.0 |
| $Cx_2/Cx_1$ | 1.0 | 1.25 | 1.50 |
| $\eta o$, percent | 40 | 53 | 80 |

Therefore, the potential efficiency of an axial-flow pump with a flow passage decreasing in area is considerably greater than that of a unit of constant area flow passage. This potential increase in efficiency occurs because the momentum properties of the airfoil cascade are altered advantageously.

As regards the linear tapering of the flow annulus through the rotors as opposed to the stators, various advantages result. For example, the pump is more easily assembled and need not be constructed to as close a tolerance because the rotors can "adjust" or give a slight bit in an axial direction to properly set or determine the distance between the rotor blades and rub ring. It will be clear from the above description that the present invention provides a jet boat pump which operates with greater efficiency than presently available pumps.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. Propulsion apparatus for watercraft comprising: a water conveying conduit having an inlet end and a restricted outlet end, a shaft extending longitudinally and centrally of said conduit, a pair of annular bearings surrounding said shaft and spaced longitudinally thereof, a pair of annular bearing sleeves surrounding said bearings, a plurality of radially extending stator vanes fixed to one of said bearing sleeves and the interior surface of said conduit and mounting said bearing sleeves centrally of said conduit for rotatable support of said shaft; a first hub fixed to said shaft upstream of said stator vanes and positioned between said annular bearing sleeves, a plurality of rotor blades fixed to said first hub; a second hub fixed to said shaft adjacent one of said bearing sleeves, a plurality of rotor blades fixed to said second hub, means for rotating said shaft to cause said rotor blades to pump water through said conduit, said first hub having a diameter which tapers linearly with distance from a smaller outside diameter toward the inlet end to a larger outside diameter adjacent said one bearing sleeve, said one bearing sleeve having a constant outside diameter equal to the diameter of said first hub at its larger end, said second hub having one end adjacent said one bearing sleeve, said second hub having an outside diameter which increases linearly with distance from a diameter at said one end which is equal to the diameter of said one bearing sleeve to a larger diameter at said other end, said other bearing sleeve having a constant outside diameter equal to the diameter of said second hub's other end, the interior surface of said conduit having a configuration which tapers linearly from a larger upstream to a smaller downstream inside diameter around said first hub and rotor blades, is then of constant inside diameter around said one bearing sleeve, then tapers linearly to a smaller downstream inside diameter around said second hub and rotor blades, and is then of constant inside diameter around a stator member and stator blades, whereby an annular water passage is provided which decreases in area about said rotor hubs and is constant in size about said bearing sleeve and stator member.

2. Propulsion apparatus for watercraft comprising a water conveying conduit having an inlet end and a restricted outlet end, a shaft extending longitudinally and centrally of said conduit, a pair of annular bearings surrounding said shaft and spaced longitudinally thereof, a pair of annular bearing sleeves surrounding said bearings, radially extending stator vanes fixed to the annular bearing sleeves and the interior surface of said conduit, mounting said bearings, and said bearing sleeves centrally of said conduit for rotatable support of said shaft, a first hub fixed to said shaft upstream of said stator vanes and positioned between said annular bearing sleeves, a plurality of rotor blades fixed to said first hub, a second hub fixed to said shaft adjacent one of said bearing sleeves, a plurality of rotor blades fixed to said second hub, means for rotating said shaft to cause said rotor blades to pump water through said conduit, said first hub having a diameter which tapers linearly with distance from a smaller outside diameter toward the inlet end to a larger outside diameter adjacent said one bearing sleeve, said one bearing sleeve having a constant outside diameter equal to the diameter of said first hub at its larger end, said second hub having one end adjacent said one bearing sleeve, said second hub having a diameter which increases linearly with distance from a diameter at said one end which is equal to the diameter of said one bearing sleeve to a larger diameter at said other end, said other bearing sleeve having a constant outside diameter equal to the diameter of said second hub's other end.

3. Propulsion apparatus for watercraft comprising a water conveying conduit having an inlet end and a restricted outlet end, a shaft extending longitudinally and centrally of said conduit, a pair of annular bearings surrounding said shaft and spaced longitudinally thereof, a pair of annular bearing sleeves surrounding said bearings, radially extending stator vanes fixed to the annular bearing sleeves and the interior surface of said conduit and mounting said bearing sleeves centrally of said conduit for rotatable support of said shaft; a first hub fixed to said shaft upstream of said stator vanes and positioned between said annular bearing sleeves, a plurality of rotor blades fixed to said first hub, a second hub fixed to said shaft adjacent one of said bearing sleeves, a plurality of rotor blades fixed to said second hub, means for rotating said shaft to cause said rotor blades to pump water through said conduit, said conduit, bearing sleeves and hubs defining an annular passage therebetween which decreases in cross sectional area from said inlet end to said outlet end.

References Cited by the Examiner

UNITED STATES PATENTS

| | | | |
|---|---|---|---|
| 859,938 | 7/1907 | Gow | 230—122 |
| 968,829 | 8/1910 | Bennett | 103—93 |
| 1,348,815 | 8/1920 | Lewis | 103—90 |
| 1,554,472 | 9/1925 | Ulmann | 103—93 |
| 1,758,175 | 5/1930 | Schaer | 103—93 |
| 2,613,869 | 10/1952 | Anxionnaz et al. | 60—35.5 |
| 2,643,085 | 6/1953 | Durkin et al. | 230—122 |

FOREIGN PATENTS

| | | |
|---|---|---|
| 107,876 | 7/1939 | Australia. |
| 121,245 | 4/1946 | Australia. |
| 765,345 | 1/1957 | Great Britain. |

MARK NEWMAN, *Primary Examiner.*

HENRY F. RADUAZO, *Examiner.*